Nov. 6, 1945.  S. O. WHITE  2,388,455
TRANSMISSION CONTROL
Filed March 8, 1943
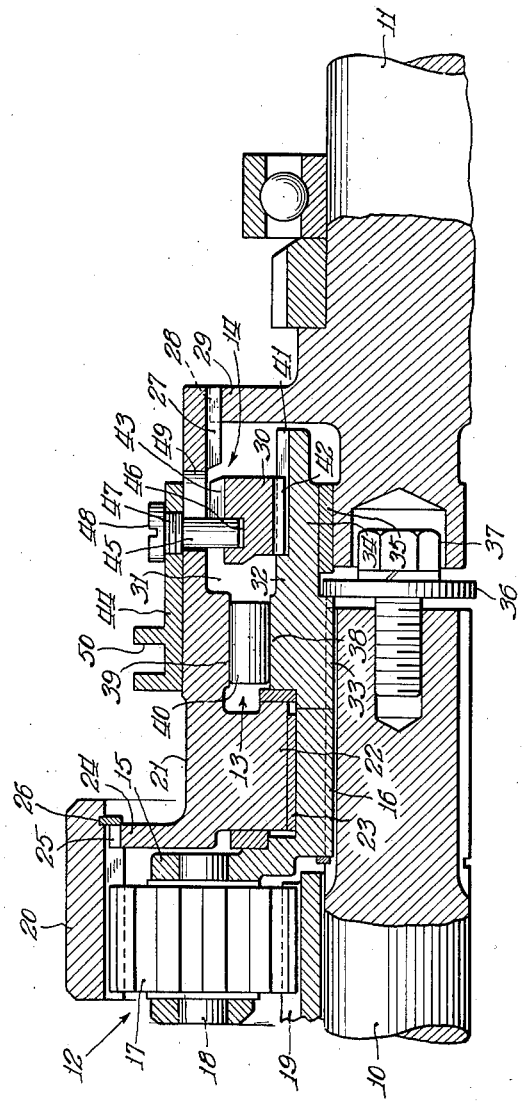
Inventor:
Samuel O. White
By:
Edward C. Fritzbaugh
Atty.

Patented Nov. 6, 1945

2,388,455

UNITED STATES PATENT OFFICE 2,388,455

TRANSMISSION CONTROL

Samuel O. White, Muncie, Ind., assignor to Borg-Warner Corporation, Chicago, Ill., a corporation of Illinois Application March 8, 1943, Serial No. 478,383

3 Claims. (Cl. 74—290)

This invention relates to change speed transmissions and has as its general object to provide an improved and simplified arrangement of jaw clutch and shifting means therefor.

The invention deals particularly with transmissions of a type, such as an overdrive transmission, wherein gearing is provided for transmitting a drive of a ratio other than 1:1, an overrunning clutch is provided for transmitting a one-way direct drive, and a jaw clutch is provided for bridging across the overrunning clutch with a two-way direct drive. In a well known type of overdrive transmission, an overdrive from a driving to a driven shaft is established through planetary gearing, an overrunning clutch is interposed directly between the driving and driven members, for picking up the drive in direct when the planetary gearing is released, and there is provided a jaw clutch which has the double function of establishing, in one position a drive from the overdriven member of the planetary gearing to the driven member and in another position, a direct two-way drive from the driving to the driven member bridging the overrunning clutch for the purpose of providing a driving connection in reverse. In this arrangement it is necessary to mesh the clutch teeth not only when shifting from overdrive to the two-way direct drive, but also when returning from the two-way direct drive to overdrive.

One of the objects of the present invention is to simply a transmission of this general type by eliminating one set of clutch teeth and to correspondingly simplify the shifting operation. To this end, the invention contemplates a permanent driving connection between the overdriven member of the planetary gearing and the driven shaft in a simplified form of lock-up clutch which in one position establishes a direct two-way drive bridging the overrunning clutch and in its other position is completely inoperative.

It has previously been proposed to provide, in an overdrive transmission, an arrangement incorporating a permanent driving connection between the overdrive member of the planetary gearing and the driven shaft, and a jaw clutch to establish a direct two-way drive across the overrunning clutch. However, in this previous arrangement, the jaw clutch, as in the conventional commercial overdrive transmission mentioned above, forms a part of the drive from the overdriven planetary member to the driven shaft, the difference being that it is permanently in mesh with the overdriven member.

An object of the present invention is to provide an arrangement in which the shiftable jaw clutch member forms no part of the permanent driving connection from the overdriven member to the driven shaft.

Another object of the invention is to provide an arrangement wherein the jaw clutch is completely enclosed and protected within the rotating assembly as contrasted to the previously proposed arrangement above referred to, wherein the shift member of the jaw clutch is enclosed only by the outer transmission casing.

These and other objects and features of this invention will become apparent from the following specification when taken together with the accompanying drawing which discloses an axial sectional view of an overdrive transmission embodying the invention.

As an example of one form in which the invention may be embodied, I have shown in the drawing a portion of an overdrive transmission of the general type disclosed in the pending application, Serial No. 309,718, of Harold E. Carnagua, filed December 18, 1939, for Overdrive transmission. In such a transmission, the driving shaft 10, which is adapted to be driven from the tail shaft of the conventional multiple speed transmission, is adapted to transmit to the driven shaft 11 either an overdrive (through the overdrive gearing indicated generally at 12), or a direct one-way drive (through the overrunning clutch indicated generally at 13), or a direct two-way drive (through the jaw clutch indicated generally at 14). The planetary gearing 12 includes a carrier 15 having a hub 16 splined upon the driving shaft 10, planet gears 17 journalled on stub shafts 18 mounted in the carrier 15, and a fulcrum gear 19 (the sun gear) against which the planet gears 17 are adapted to track so as to transmit an overdrive to the ring gear 20 when the fulcrum gear is held against rotation. Suitable means (not shown) for braking the fulcrum gear is provided, and this means may be released to permit the fulcrum gear to rotate idly with the planet gears and ring gear when a drive is being transmitted through either of the direct drive means 13 and 14.

The drive is transmitted from the ring gear 20 to the driven shaft 11 by means of a sleeve 21 which is provided at one end with an inwardly projecting collar portion 22 journalled on the hub portion 16 of the carrier 15 through the medium of a bushing 23, and an outwardly projecting flange portion 24 having teeth 25 permanently meshing with reduced extensions of the teeth of the ring gear 20, the flange and ring gear being held in assembled relationship by a snap ring 26 engaging in a groove in the ring gear 20.

In present commercial overdrives, the sleeve 21 terminates with the collar 22 and a jaw clutch sleeve is provided to bridge from the collar 22 to the driven shaft 11. Such a clutch sleeve is relatively large in diameter, has two sets of clutch teeth, and therefore involves considerable machining. In accordance with the present invention, the sleeve 21 is extended to completely bridge from the overdriven ring gear to the driven shaft and is permanently connected to the latter by means of internal teeth 27 formed within its end region opposite the collar 22 and meshing with external teeth 28 on a radially outwardly extending flange 29 on the driven shaft 11. The clutch annulus 30 is of considerably smaller diameter and greatly reduced in axial extent as compared to the clutch sleeve of the existing overdrive, and is received in an annular space 31 between the sleeve 21 and a smaller sleeve 32 which has one end portion 33 splined upon the driving shaft 10 and an opposite end portion 34 which is piloted on the shaft 11 through the medium of a bushing 35. The portion 34 has a larger internal diameter than the portion 33, thus forming a shoulder which is engaged by a washer 36, secured by a screw 37 threaded into the end of the driving shaft 10 so as to secure the sleeve 32 on the shaft 10.

The outer periphery of the sleeve portion 33 constitutes the cam member 38 of the overrunning clutch 13. In the sleeve 21, adjacent the collar portion 22, is formed the outer member 39 of the overrunning clutch. Between the inner and outer members 38 and 39 are interposed the clutch rollers 40.

The portion 34 of the sleeve 32 is formed on its outer periphery with external splines 41 and the jaw clutch annulus 30 is formed with internal splines 42 slidably meshing with the splines 41. Thus the annulus 30 receives a drive from the driving shaft 10 through the medium of the sleeve 32. The annulus 30 is adapted to transmit this drive, in the form of a two-way direct drive, to the driven shaft 11 through the medium of external clutch teeth 43 formed on its outer periphery and internal teeth 27 of the sleeve 21, which teeth are adapted to mesh with each other when the annulus 30 is shifted to the right as viewed in the drawing.

The shifting of the annulus 30 is effected by a shift sleeve 44 encircling and slidably mounted upon the sleeve 21, and fingers 45 mounted in the sleeve 44 and extending radially inwardly into an annular channel 46 in the annulus 30. The fingers 45 are in the form of cylindrical studs having heads 48 and threaded portions 47 threaded through the shift sleeve 44. The fingers 45 extend through axially elongated opening 49 in the sleeve 21.

The shift sleeve 44 is provided with a channel 50 with which a suitable shift fork (not shown) is adapted to cooperate for transmitting shifting movement to the sleeve.

I claim:

1. In a transmission, a driving shaft and a driven shaft, means for transmitting an overdrive from the driving shaft to the driven shaft, said means including planetary gearing having its planet gear carrier continuously joined to said driving shaft, an overrunning clutch for transmitting a one-way direct drive from the driving shaft to the driven shaft, means comprising a shiftable clutch annulus for transmitting a two-way direct drive between said driving shaft and said driven shaft, a shift member for said clutch annulus, a hollow member engageable with said clutch annulus to provide said two-way direct drive and providing a direct connection between the ring gear of said planetary gearing and said driven shaft and constituting an outer member for said overrunning clutch and a support and guide for said shift member, and a sleeve disposed on and connected to the driving shaft for rotation therewith and continuously serving as the inner member of said overrunning clutch and as the carrier for said shiftable clutch annulus.

2. In a transmission, a driving shaft and a driven shaft; means for transmitting an overdrive from the driving shaft to the driven shaft, said means including planetary gearing wherein the sun gear is stationary during overdrive, the planet gear carrier is directly and constantly connected to and driven by the driving shaft, and the ring gear drives the driven shaft; an overrunning clutch having an inner member and an outer member and rollers therebetween for transmitting a one-way direct drive from the driving shaft to the driven shaft; means, comprising a shiftable clutch annulus having internal and external teeth and an annular groove about its hub, for selectively transmitting a two-way direct drive between said driving shaft and said driven shaft; a shift member for said clutch annulus, said shift member comprising a sleeve carrying an inwardly extending radial arm; a hollow member having an axially extending slot in its side and internal clutch teeth engageable with the external teeth on said clutch annulus to provide said two-way direct drive, said hollow member providing a direct connection between said ring gear and said driven shaft and constituting the outer member for said overrunning clutch and a support and guide for the said shift member, said shift member being external of said hollow member and having its radial arm passing through the slot in said hollow member to engage the annular groove in said clutch annulus; and a sleeve disposed on and connected to the driving shaft for rotation therewith and having external teeth engaging with the internal teeth of said clutch annulus, said sleeve thereby continuously serving as a carrier for said clutch annulus and also as the inner member of said overrunning clutch.

3. In a transmission, a driving shaft and a driven shaft, said driven shaft having external teeth, means for transmitting an overdrive from the driving shaft to the driven shaft, said means including planetary gearing comprising a ring gear and a planet gear carrier which has a direct and continuous connection with said driving shaft, an overrunning clutch having an inner member and an outer member and rollers therebetween for transmitting a one-way direct drive from the driving shaft to the driven shaft, means for selectively transmitting a two-way direct drive between said driving shaft and said driven shaft and comprising a shiftable clutch annulus having internal and external teeth, a shift member for said clutch annulus, a hollow member having internal clutch teeth which are engageable with the external teeth on said clutch annulus to provide said two-way direct drive and also are directly engaged with the external teeth of said driven shaft, said hollow member providing a direct connection between said ring gear and said driven shaft through the respective teeth of the hollow member and driven shaft and constituting the outer member for said overrunning clutch and a support and guide for said shift member, and a sleeve disposed on and connected to the driving shaft for rotation therewith and having external teeth engaging with the internal teeth of said clutch annulus, said sleeve also serving as the inner member of said overrunning clutch.

SAMUEL O. WHITE.